US012203480B2

(12) United States Patent
Okochi et al.

(10) Patent No.: US 12,203,480 B2
(45) Date of Patent: Jan. 21, 2025

(54) MOTOR-DRIVEN COMPRESSOR

(71) Applicant: KABUSHIKI KAISHA TOYOTA JIDOSHOKKI, Aichi-ken (JP)

(72) Inventors: Takeshi Okochi, Kariya (JP); Yusuke Kinoshita, Kariya (JP); Junya Yano, Kariya (JP); Shogo Urabe, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 17/688,208

(22) Filed: Mar. 7, 2022

(65) Prior Publication Data

US 2022/0290678 A1 Sep. 15, 2022

(30) Foreign Application Priority Data

Mar. 10, 2021 (JP) ................................ 2021-038031

(51) Int. Cl.
*F04D 29/08* (2006.01)
*F04D 17/10* (2006.01)
*F04D 25/08* (2006.01)

(52) U.S. Cl.
CPC ........... *F04D 29/083* (2013.01); *F04D 17/10* (2013.01); *F04D 25/082* (2013.01); *F05D 2240/55* (2013.01)

(58) Field of Classification Search
CPC .. F05D 2240/14; F05D 2240/55; F04D 17/10; F04D 25/06; F04D 25/0606; F04D 25/068; F04D 25/08; F04D 25/082; F04D 29/083; F04D 29/403; F16J 15/02; F16J 15/021
See application file for complete search history.

(56) References Cited

U.S. PATENT DOCUMENTS

| | | | | |
|---|---|---|---|---|
| 9,071,113 | B2 * | 6/2015 | Abe | H02K 5/225 |
| 10,340,765 | B2 * | 7/2019 | Yamasaki | H02K 5/04 |
| 2002/0110461 | A1 * | 8/2002 | Iwanami | F04C 29/0085 417/321 |

(Continued)

FOREIGN PATENT DOCUMENTS

| | | |
|---|---|---|
| JP | S48-99765 U | 11/1973 |
| JP | 2000-257719 A | 9/2000 |

(Continued)

*Primary Examiner* — David E Sosnowski
*Assistant Examiner* — Arthur Paul Golik
(74) *Attorney, Agent, or Firm* — Greenblum & Bernstein, P.L.C.

(57) ABSTRACT

A motor-driven compressor includes a rotary shaft, an electric motor, a compression unit, an inverter, a housing, and an inverter case. The housing includes a housing end wall and a housing circumferential wall, which extends from a housing end wall in an axial direction of the rotary shaft. The inverter case includes a case end wall, which extends in the axial direction from the case end wall. The seal circumferential wall includes a proximal end connected to the case end wall and an end face located at a distal end. The housing circumferential wall includes an opposed surface that is opposed to the end face. An annular seal member is provided between the seal circumferential wall and the housing circumferential wall. The seal member extends in a radial direction of the rotary shaft between the end face and the opposed surface.

4 Claims, 2 Drawing Sheets

(56) References Cited

U.S. PATENT DOCUMENTS

| | | | |
|---|---|---|---|
| 2012/0237376 | A1 | 9/2012 | Kinoshita et al. |
| 2013/0034975 | A1 * | 2/2013 | Yoshida ................. H01R 12/57 439/78 |
| 2013/0320792 | A1 * | 12/2013 | Fukasaku ........... H02K 11/0141 310/89 |
| 2016/0353595 | A1 | 12/2016 | Yogo et al. |
| 2017/0104392 | A1 | 4/2017 | Mizuno et al. |
| 2017/0276136 | A1 * | 9/2017 | Kinoshita ........... F04C 18/0215 |
| 2020/0313495 | A1 | 10/2020 | Yamakage et al. |

FOREIGN PATENT DOCUMENTS

| | | | |
|---|---|---|---|
| JP | 2002-339867 | A | 11/2002 |
| JP | 2015-055201 | A | 3/2015 |
| JP | 2015-183525 | A | 10/2015 |
| JP | 2017-031886 | A | 2/2017 |
| JP | 2020-165423 | A | 10/2020 |
| KR | 10-1290863 | B1 | 9/2012 |

* cited by examiner

MOTOR-DRIVEN COMPRESSOR

BACKGROUND

1. Field

The present disclosure relates to a motor-driven compressor.

2. Description of Related Art

A typical motor-driven compressor includes a rotary shaft, an electric motor that rotates the rotary shaft, a compression unit that is driven by rotation of the rotary shaft to compress fluid, and an inverter that drives the electric motor. The motor-driven compressor further includes a tubular housing that accommodates the electric motor. The housing includes a housing end wall and a housing circumferential wall. The housing circumferential wall extends in an axial direction of the rotary shaft from the housing end wall.

For example, Japanese Laid-Open Patent Publication No. 2020-165423 discloses a motor-driven compressor that includes an inverter case accommodating an inverter. The inverter case is fixed to the housing. The inverter case includes a case end wall and a seal circumferential wall. The case end wall is opposed to the housing end wall in the axial direction. The seal circumferential wall extends in the axial direction from the case end wall. The seal circumferential wall surrounds a section of an outer circumferential surface of the housing circumferential wall. An annular seal member is provided between an inner circumferential surface of the seal circumferential wall and the outer circumferential surface of the housing circumferential wall. The seal member provides a seal between the inner circumferential surface of the seal circumferential wall and the outer circumferential surface of the housing circumferential wall. The seal member blocks water, for example, salt water, that attempts to enter, from the outside, the gap between the inner circumferential surface of the seal circumferential wall and the outer circumferential surface of the housing circumferential wall.

The seal circumferential wall includes a proximal end connected to the case end wall and an end face located at a distal end that is on a side opposite to the proximal end. In some cases, the housing circumferential wall has an opposed surface that is opposed to the end face of the seal circumferential wall in the axial direction. In such a case, the water blocked by the seal member may accumulate in the gap between the end face of the seal circumferential wall and the opposed surface of the housing circumferential wall. Such water can corrode the housing or the inverter case.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor-driven compressor is provided that includes a rotary shaft, an electric motor that is configured to rotate the rotary shaft, a compression unit that is driven by rotation of the rotary shaft and is configured to compress a fluid, an inverter that is configured to drive the electric motor, and a housing that accommodates the electric motor and includes a housing end wall and a housing circumferential wall, and an inverter case. The housing circumferential wall extends from the housing end wall in an axial direction of the rotary shaft. The inverter case accommodates the inverter and is fixed to the housing. The inverter case includes a case end wall that is opposed to the housing end wall in the axial direction, and a seal circumferential wall that extends from the case end wall in the axial direction and surrounds a section of an outer circumferential surface of the housing circumferential wall. The seal circumferential wall includes a proximal end connected to the case end wall and an end face located at a distal end that is on a side opposite to the proximal end. The housing circumferential wall includes an opposed surface that is opposed to the end face in the axial direction. An annular seal member is provided between an inner circumferential surface of the seal circumferential wall and the outer circumferential surface of the housing circumferential wall. The seal member extends in a radial direction of the rotary shaft between the end face and the opposed surface.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A motor-driven compressor 10 according to one embodiment will now be described with reference to FIGS. 1 and 2. The motor-driven compressor 10 is used in a vehicle air conditioner 24.

Overall Configuration of Motor-Driven Compressor 10

Figure 1:
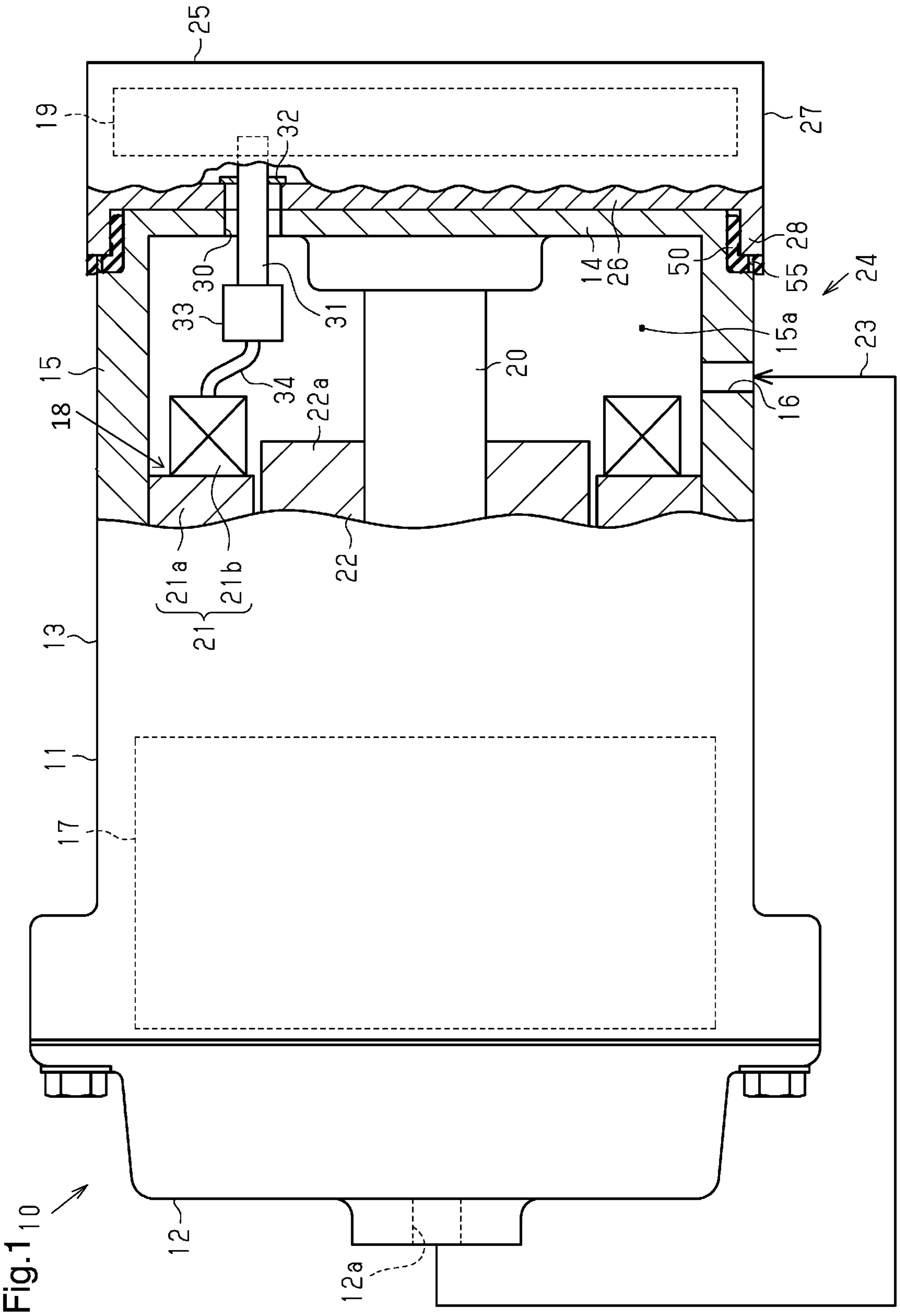
FIG. 1 is a partially cut away side view showing a motor-driven compressor according to an embodiment.

As shown in FIG. 1, the motor-driven compressor 10 includes a tubular housing 11. The housing 11 is made of metal. The housing 11 includes a discharge housing member 12 and a motor housing member 13. The discharge housing member 12 and the motor housing member 13 are made of, for example, aluminum. The discharge housing member 12 is coupled to the motor housing member 13. The motor housing member 13 includes a plate-shaped housing end wall 14 and a tubular housing circumferential wall 15, which extends from the outer circumferential edge of the housing end wall 14. The housing circumferential wall 15 includes a suction port 16. Refrigerant, which is fluid, is drawn into the motor housing member 13 through the suction port 16 from the outside. The housing 11 thus includes the suction port 16.

The motor-driven compressor 10 includes a compression unit 17, which compresses the refrigerant, an electric motor 18, which drives the compression unit 17, and an inverter 19, which drives the electric motor 18. The motor-driven compressor 10 also includes a rotary shaft 20. The rotary shaft 20 is accommodated in the motor housing member 13 with the axis of the rotary shaft 20 agreeing with the axis of the housing circumferential wall 15. The housing circumferential wall 15 thus extends in the axial direction of the rotary shaft 20.

The compression unit 17 and the electric motor 18 are accommodated in the motor housing member 13. Specifically, the housing circumferential wall 15 includes a motor accommodating chamber 15*a*, which accommodates the electric motor 18. The housing 11 thus accommodates the electric motor 18. The compression unit 17 and the electric motor 18 arranged in the axial direction of the rotary shaft 20. The electric motor 18 is arranged between the compression unit 17 and the housing end wall 14. The electric motor 18 rotates the rotary shaft 20. The compression unit 17 is driven by rotation of the rotary shaft 20 to compress the refrigerant.

The compression unit 17 is of, for example, a scroll type that includes a fixed scroll (not shown) fixed in the motor housing member 13 and a movable scroll (not shown) opposed to the fixed scroll.

The electric motor 18 includes a tubular stator 21 and a rotor 22, which is arranged on the inner side of the stator 21. The rotor 22 rotates integrally with the rotary shaft 20. The stator 21 surrounds the rotor 22. The rotor 22 includes a rotor core 22*a*, which is fixed to the rotary shaft 20, and permanent magnets (not shown), which are provided on the rotor core 22*a*. The stator 21 includes a tubular stator core 21*a* and a motor coil 21*b*, which is wound about the stator core 21*a*.

The suction port 16 is connected to a first end of an external refrigerant circuit 23. The discharge housing member 12 includes a discharge port 12*a*. The discharge port 12*a* is connected to a second end of the external refrigerant circuit 23. The suction port 16 connects the outside and the motor accommodating chamber 15*a* to each other. Refrigerant is drawn into the motor accommodating chamber 15*a* of the motor housing member 13 from the external refrigerant circuit 23 through the suction port 16. The drawn refrigerant is compressed by the compression unit 17 when the compression unit 17 is driven, and flows out to the external refrigerant circuit 23 through the discharge port 12*a*. The refrigerant that has flowed out to the external refrigerant circuit 23 returns to the motor housing member 13 through the suction port 16 via a heat exchanger and an expansion valve (neither is shown) of the external refrigerant circuit 23. The motor-driven compressor 10 and the external refrigerant circuit 23 are part of the vehicle air conditioner 24.

Configuration of Inverter Case 25

The motor-driven compressor 10 includes a tubular inverter case 25. The inverter case 25 accommodates the inverter 19. The inverter case 25 includes a plate-shaped case end wall 26 and a tubular case circumferential wall 27, which extends from the outer circumference of the case end wall 26. The case end wall 26 is opposed to the housing end wall 14 in the axial direction of the rotary shaft 20. The inverter case 25 is fixed to the motor housing member 13 by attaching the case end wall 26 to the housing end wall 14. The inverter case 25 is thus fixed to the housing 11. The compression unit 17, the electric motor 18, and the inverter 19 are arranged in the order in the axial direction of the rotary shaft 20.

Figure 2:
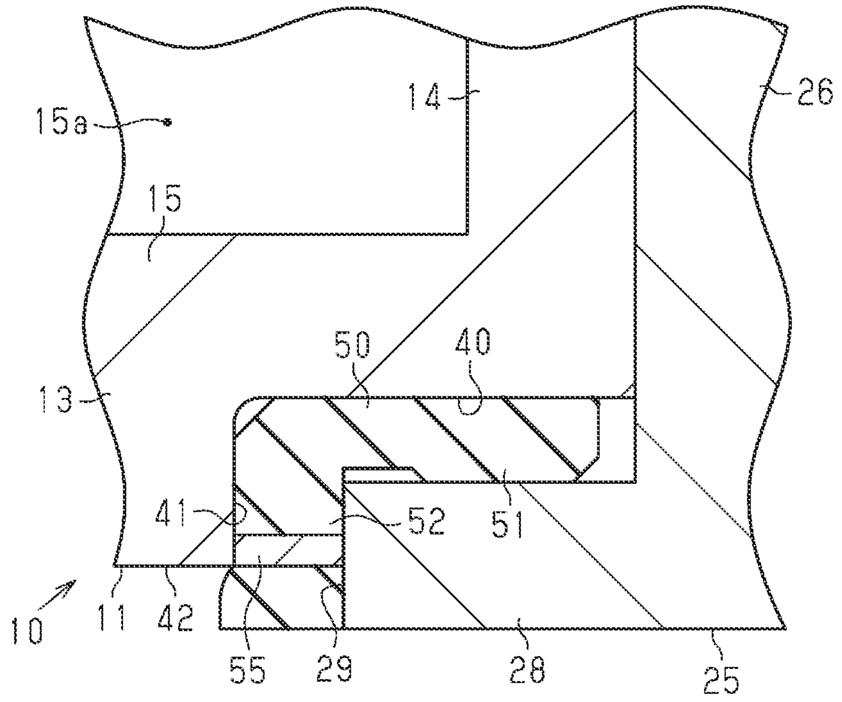
FIG. 2 is an enlarged cross-sectional view showing a part of the motor-driven compressor of FIG. 1.

As shown in FIG. 2, the inverter case 25 includes a seal circumferential wall 28 having a circular cross section. The seal circumferential wall 28 extends away from the case circumferential wall 27 from the outer circumferential edge of the case end wall 26. The seal circumferential wall 28 extends in the axial direction of the rotary shaft 20 from the case end wall 26. An inner circumferential surface of the seal circumferential wall 28 extends along an outer circumferential surface of the housing circumferential wall 15. The seal circumferential wall 28 surrounds a section of the outer circumferential surface of the housing circumferential wall 15. The seal circumferential wall 28 includes a proximal end connected to the case end wall 26 and a case end face 29 located at a distal end that is on a side opposite to the proximal end. The case end face 29 is an end face of the seal circumferential wall 28 in the axial direction.

Electrical Connection of Electric Motor 18 and Inverter 19

As shown in FIG. 1, the motor-driven compressor 10 has a through-hole 30. The through-hole 30 extends through the housing end wall 14 and the case end wall 26. The motor-driven compressor 10 also includes three conductive members 31. For the illustrative purposes, only one of the conductive members 31 is illustrated in FIG. 1. The conductive members 31 are supported by the case end wall 26 with a supporting plate 32.

Each conductive member 31 is electrically connected to the inverter 19. Each conductive member 31 extends from inside the inverter case 25 and through the through-hole 30 so as to protrude into the motor housing member 13. The three conductive members 31 are respectively electrically connected to three motor wires 34 routed out of the electric motor 18 via a cluster block 33 arranged in the motor housing member 13. Accordingly, the electric motor 18 and the inverter 19 are electrically connected to each other through the motor wires 34, the cluster block 33, and the conductive members 31. The inverter 19 supplies power to the electric motor 18 through the conductive members 31, the cluster block 33, and the motor wires 34, thereby driving the electric motor 18.

Configuration of Housing Circumferential Wall 15

As shown in FIG. 2, the outer circumferential surface of the housing circumferential wall 15 includes a first housing outer circumferential surface 40, a housing opposed surface 41, and a second housing outer circumferential surface 42. The first housing outer circumferential surface 40 is a section of the outer circumferential surface of the housing circumferential wall 15 that is surrounded by the seal circumferential wall 28. The first housing outer circumferential surface 40 extends in the axial direction of the housing circumferential wall 15. A first edge of the first housing outer circumferential surface 40 (the edge contacting the inverter case 25) is opposed to the case end wall 26 in the axial direction of the housing circumferential wall 15.

The housing opposed surface 41 is an annular opposed surface of the outer circumferential surface of the housing circumferential wall 15 that is opposed to the case end face 29 in the axial direction of the rotary shaft 20. The housing opposed surface 41 extends outward in the radial direction of the rotary shaft 20 from a second edge of the first housing outer circumferential surface 40 (the edge on the side opposite to the first edge). The housing opposed surface 41 is a flat surface.

The second housing outer circumferential surface 42 is tubular and extends in the axial direction of the housing circumferential wall 15. The second housing outer circumferential surface 42 extends from the outer circumferential edge of the housing opposed surface 41 and away from the inverter case 25. The housing opposed surface 41 connects the first housing outer circumferential surface 40 and the second housing outer circumferential surface 42 to each other. The housing opposed surface 41 is a step surface that extends in the radial direction of the rotary shaft 20 between the first housing outer circumferential surface 40 and the second housing outer circumferential surface 42. The outer diameter of the second housing outer circumferential surface 42 is larger than the outer diameter of the first housing outer circumferential surface 40. The outer diameter of the second housing outer circumferential surface 42 is smaller than the outer diameter of the seal circumferential wall 28.

Configuration of Seal Member 50

The motor-driven compressor 10 includes an annular seal member 50. The seal member 50 is provided between the inner circumferential surface of the seal circumferential wall 28 and the outer circumferential surface of the housing circumferential wall 15. The seal member 50 includes a first seal portion 51 and a second seal portion 52. The first seal portion 51 is tubular and extends in the axial direction. The second seal portion 52 is an annular flange that extends outward with respect to the first seal portion 51.

The first seal portion 51 is arranged between and held by the inner circumferential surface of the seal circumferential wall 28 and the first housing outer circumferential surface 40. The outer circumference of the first seal portion 51 is in close contact with the inner circumferential surface of the seal circumferential wall 28. The inner circumference of the first seal portion 51 is in close contact with the first housing outer circumferential surface 40. The first seal portion 51 thus provides a seal between the inner circumferential surface of the seal circumferential wall 28 and the first housing outer circumferential surface 40 of the housing circumferential wall 15. Accordingly, in the motor-driven compressor 10, the seal member 50 provides a seal between the inner circumferential surface of the seal circumferential wall 28 and the outer circumferential surface of the housing circumferential wall 15.

Most of the second seal portion 52 is arranged between and held by the case end face 29 and the housing opposed surface 41. A section of the second seal portion 52 that is opposed to the case end face 29 is in close contact with the case end face 29. A section of the second seal portion 52 that is opposed to the housing opposed surface 41 is in close contact with the housing opposed surface 41. The second seal portion 52 thus provides a seal between the case end face 29 and the housing opposed surface 41. The seal member 50 extends in the radial direction of the rotary shaft 20 between the case end face 29 and the housing opposed surface 41.

The outer circumferential edge of the second seal portion 52, that is, the edge on the side opposite to the first seal portion 51, protrudes from between the case end face 29 and the housing opposed surface 41. The protruding outer circumferential edge of the second seal portion 52 extends along the case end face 29 and partially bulges over the second housing outer circumferential surface 42. Thus, part of the seal member 50 extends to the outside of the housing 11 from between the case end face 29 and the housing opposed surface 41. Also, the part of the seal member 50 is exposed to the outside of the housing 11 from between the case end face 29 and the housing opposed surface 41.

Configuration of Conductor 55

The seal member 50 includes an integrated annular conductor 55 that surrounds a section of the outer circumferential surface of the housing circumferential wall 15. The conductor 55 is made of metal. The seal member 50 and the conductor 55 are integrated by insert molding. The conductor 55 is arranged between the case end face 29 and the housing opposed surface 41. The conductor 55 is in contact with the case end face 29. The conductor 55 is electrically connected to the seal circumferential wall 28. The conductor 55 is in contact with the housing opposed surface 41. The conductor 55 is thus electrically connected to the housing circumferential wall 15 of the motor housing member 13. The conductor 55 is held between the case end face 29 and the housing opposed surface 41. The inner diameter of the conductor 55 is larger than the inner diameter of the seal circumferential wall 28. The outer diameter of the conductor 55 is equal to the outer diameter of the second housing outer circumferential surface 42.

Operation

Operation of the present embodiment will now be described.

For example, the seal member 50 blocks water, for example, salt water, that attempts to enter the gap between the inner circumferential surface of the seal circumferential wall 28 and the outer circumferential surface of the housing circumferential wall 15 from outside. Accordingly, water is prevented from entering the through-hole 30 via the gap between the inner circumferential surface of the seal circumferential wall 28 and the outer circumferential surface of the housing circumferential wall 15. As a result, water from the outside will not contact the conductive members 31. Also, the seal member 50 extends in the radial direction of the rotary shaft 20 between the case end face 29 and the housing opposed surface 41. Thus, the water blocked by, for example, the seal member 50 is prevented from accumulating in the gap between the case end face 29 and the housing opposed surface 41.

Further, the conductor 55 is arranged between the case end face 29 and the housing opposed surface 41. Thus, the conductor 55 blocks electromagnetic noise that attempts to pass through the gap between the case end face 29 and the housing opposed surface 41. Accordingly, external electromagnetic noise is prevented from passing through the gap between the case end face 29 and the housing opposed surface 41 to enter the motor-driven compressor 10. Also, electromagnetic noise inside the motor-driven compressor 10 is prevented from leaking to the outside through the gap between the case end face 29 and the housing opposed surface 41.

Advantages

The above-described embodiment has the following advantages.

(1) The seal member 50 extends in the radial direction of the rotary shaft 20 between the case end face 29 and the housing opposed surface 41. Thus, for example, water such as salt water that is blocked by the seal member 50 is prevented from accumulating in the gap between the case end face 29 and the housing opposed surface 41. This improves the corrosion resistance of the motor-driven compressor 10.

(2) When the motor housing member 13 is cooled by the refrigerant that is drawn into the motor housing member 13 through the suction port 16 from the outside, the seal member 50 is also cooled. This may cause the seal member 50 to contract. Even in this case, since part of the seal member 50 extends to the outside of the housing 11 from between the case end face 29 and the housing opposed surface 41, no gap is created between the case end face 29 and the housing opposed surface 41. Thus, for example, water that is blocked by the seal member 50 is prevented from accumulating in the gap between the case end face 29 and the housing opposed surface 41.

(3) The conductor 55 is arranged between the case end face 29 and the housing opposed surface 41. Thus, the conductor 55 blocks electromagnetic noise that attempts to pass through the gap between the case end face 29 and the housing opposed surface 41. Accordingly, external electromagnetic noise is prevented from passing through the gap between the case end face 29 and the housing opposed surface 41 to enter the motor-driven compressor 10. Also, electromagnetic noise inside the motor-driven compressor 10 is prevented from leaking to the outside through the gap between the case end face 29 and the housing opposed surface 41.

(4) The conductor 55 is held between the case end face 29 and the housing opposed surface 41. Accordingly, the part of the seal member 50 that is located between the case end face 29 and the housing opposed surface 41 is accurately positioned between the case end face 29 and the housing opposed surface 41. This improves the sealing performance of the seal member 50 between the case end face 29 and the housing opposed surface 41.

Modifications

The above-described embodiment may be modified as follows. The above-described embodiment and the following modifications can be combined as long as the combined modifications remain technically consistent with each other.

Part of the seal member 50 does not necessarily need to extend to the outside of the housing 11 from between the case end face 29 and the housing opposed surface 41.

The conductor 55 does not necessarily need to be held between the case end face 29 and the housing opposed surface 41. In this case, the conductor 55 may be arranged between the case end face 29 and the housing opposed surface 41 while being separated from the case end face 29 and the housing opposed surface 41.

The conductor 55 does not necessarily need to be arranged between the case end face 29 and the housing opposed surface 41. The annular conductor 55 does not necessarily need to be integrated with the seal member 50.

The outer diameter of the conductor 55 may be smaller than the outer diameter of the second housing outer circumferential surface 42, or the outer diameter of the conductor 55 may be larger than the outer diameter of the second housing outer circumferential surface 42.

The case end face 29 and the housing opposed surface 41 may extend in stepped shapes that conform to each other, and the seal member 50 may extend in a stepped shape between the case end face 29 and the housing opposed surface 41.

The compression unit 17 is not limited to a scroll type, but may be, for example, a piston type or a vane type.

The motor-driven compressor 10 may be used in apparatuses other than the vehicle air conditioner 24. For example, the motor-driven compressor 10 may be mounted on a fuel cell vehicle and use the compression unit 17 to compress air, which is a fluid supplied to the fuel cell.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor, comprising:

a rotary shaft;

an electric motor that is configured to rotate the rotary shaft;

a compression unit that is driven by rotation of the rotary shaft, the compression unit being configured to compress a fluid;

an inverter that is configured to drive the electric motor; and a housing that accommodates the electric motor and includes a housing end wall and a housing circumferential wall, the housing circumferential wall extending from the housing end wall in an axial direction of the rotary shaft; and an inverter case that accommodates the inverter and is fixed to the housing, wherein the inverter case includes:

a case end wall that is opposed to the housing end wall in the axial direction, the case end wall having a circumferential extent; and a seal circumferential wall that is integrally formed with the case end wall and extends in the axial direction towards the housing from the circumferential extent of the case end wall, such that the seal circumferential wall overlaps the circumferential extent of the case end wall in the axial direction, wherein the seal circumferential wall surrounds a section of an outer circumferential surface of the housing circumferential wall, the seal circumferential wall includes a proximal end connected to the case end wall and a case end face located at a distal end that is on a side opposite to the proximal end, the housing circumferential wall includes an opposed surface that is opposed to the case end face in the axial direction, an annular seal member is provided between an inner circumferential surface of the seal circumferential wall and the outer circumferential surface of the housing circumferential wall, and the seal member extends in a radial direction of the rotary shaft between the case end face and the opposed surface, wherein the housing circumferential wall includes a motor accommodating chamber that accommodates the electric motor, the housing circumferential wall includes a suction port, the suction port connects an outside of the housing and the motor accommodating chamber to each other, a refrigerant that is the fluid is drawn into the housing from the outside through the suction port, and a part of the seal member extends to the outside of the housing from between the case end face and the opposed surface, and wherein the case end wall and the housing end wall are in contact, an entire axial length of a first housing outer circumferential surface from the opposed surface to a housing end face of the housing end wall in contact with the case end wall is longer than an entire axial length of the inner circumferential surface of the seal circumferential wall from the case end face to the housing end face of the housing end wall, the seal member provides a seal between the inner circumferential surface of the seal circumferential wall and the first housing outer circumferential surface, the seal member provides a seal between the case end face and the opposed surface.

2. The motor-driven compressor according to claim 1, wherein the seal member includes an integrated annular conductor that surrounds a section of the outer circumferential surface of the housing circumferential wall, and the conductor is arranged between the case end face and the opposed surface.

3. The motor-driven compressor according to claim 2, wherein the conductor is held between the case end face and the opposed surface.

4. A motor-driven compressor, comprising:

a rotary shaft;

an electric motor that is configured to rotate the rotary shaft;

a compression unit that is driven by rotation of the rotary shaft, the compression unit being configured to compress a fluid;

an inverter that is configured to drive the electric motor; and a housing that accommodates the electric motor and includes a housing end wall and a housing circumferential wall, the housing circumferential wall extending from the housing end wall in an axial direction of the rotary shaft; and an inverter case that accommodates the inverter and is fixed to the housing, wherein the inverter case includes:

a case end wall that is opposed to the housing end wall in the axial direction; and a seal circumferential wall that extends from the case end wall in the axial direction and surrounds a section of an outer circumferential surface of the housing circumferential wall, the seal circumferential wall includes a proximal end connected to the case end wall and a case end face located at a distal end that is on a side opposite to the proximal end, the housing circumferential wall includes an opposed surface that is opposed to the case end face in the axial direction, an annular seal member is provided between an inner circumferential surface of the seal circumferential wall and the outer circumferential surface of the housing circumferential wall, and the seal member extends in a radial direction of the rotary shaft between the case end face and the opposed surface, wherein the housing circumferential wall includes a motor accommodating chamber that accommodates the electric motor, the housing circumferential wall includes a suction port, the suction port connects an outside of the housing and the motor accommodating chamber to each other, a refrigerant that is the fluid is drawn into the housing from the outside through the suction port, and a part of the seal member extends to the outside of the housing from between the case end face and the opposed surface, and wherein the case end wall and the housing end wall are in contact, an entire axial length of a first housing outer circumferential surface from the opposed surface to a housing end face of the housing end wall in contact with the case end wall is longer than an entire axial length of the inner circumferential surface of the seal circumferential wall from the case end face to the housing end face of the housing end wall, the seal member provides a seal between the inner circumferential surface of the seal circumferential wall and the first housing outer circumferential surface, the seal member provides a seal between the case end face and the opposed surface, the seal member includes an integrated annular conductor that surrounds a section of the outer circumferential surface of the housing circumferential wall, and the conductor is arranged between the case end face and the opposed surface.

* * * * *